US 12,427,835 B2

United States Patent
Sadr et al.

(10) Patent No.: US 12,427,835 B2
(45) Date of Patent: Sep. 30, 2025

(54) INJECTION MOLDED VEHICLE COMPARTMENT PRESSURE RELIEF VALVE

(71) Applicant: MARKDOM INTERNATIONAL INC., Toronto (CA)

(72) Inventors: Changize Sadr, Toronto (CA); Bosco Wei Ming Chan, Markham (CA)

(73) Assignee: MARKDOM INTERNATIONAL INC., Toronto (CA)

( * ) Notice: Subject to any disclaimer, the term of this patent is extended or adjusted under 35 U.S.C. 154(b) by 0 days.

(21) Appl. No.: 18/619,767

(22) Filed: Mar. 28, 2024

(65) Prior Publication Data
US 2024/0239155 A1  Jul. 18, 2024

Related U.S. Application Data

(63) Continuation of application No. PCT/CA2022/051460, filed on Sep. 30, 2022.

(60) Provisional application No. 63/261,996, filed on Oct. 1, 2021.

(51) Int. Cl.
*B60H 1/24* (2006.01)
*F16K 17/04* (2006.01)

(52) U.S. Cl.
CPC ............ *B60H 1/249* (2013.01); *F16K 17/04* (2013.01)

(58) Field of Classification Search
CPC .... B29C 45/1676; F16K 15/031; B60H 1/249
See application file for complete search history.

(56) References Cited

U.S. PATENT DOCUMENTS

| | | | |
|---|---|---|---|
| 2,297,892 | A | 10/1942 | Jacobs |
| 2,802,692 | A | 8/1957 | Stocks |
| 3,405,968 | A | 10/1968 | Feles et al. |
| 5,105,849 | A | 4/1992 | Clough |
| 5,194,038 | A | 3/1993 | Klomhaus et al. |
| 5,601,117 | A * | 2/1997 | Lewis .................... B60H 1/249 454/162 |
| 5,727,999 | A | 3/1998 | Lewis |
| 6,016,802 | A | 1/2000 | Jackson |
| 6,026,852 | A | 2/2000 | Barton et al. |

(Continued)

FOREIGN PATENT DOCUMENTS

| | | |
|---|---|---|
| DE | 102009026222 B4 | 1/2014 |
| EP | 0673795 B1 | 6/1998 |

(Continued)

OTHER PUBLICATIONS

International Search Report & Written Opinion mailed Dec. 15, 2022 in PCT/CA2022/051460.

*Primary Examiner* — P. Macade Nichols

(57) ABSTRACT

A pressure relief valve apparatus for a vehicle compartment includes (a) a housing having an injection molded frame for mounting in an aperture in a vehicle panel, the frame having at least one flow opening extending therethrough; and (b) at least one injection molded flap, each flap having a flap connection portion joined to the frame adjacent an upper edge of a respective flow opening. Each flap is pivotable between a closed position in which the respective flow opening is blocked by the flap, and an open position in which the respective flow opening is unblocked for permitting pressurized air to vent through the flow opening.

32 Claims, 11 Drawing Sheets

(56) References Cited

U.S. PATENT DOCUMENTS

| | | | |
|---|---|---|---|
| 6,132,308 | A | 10/2000 | Dietz et al. |
| 6,210,266 | B1 | 4/2001 | Barton |
| 6,299,177 | B1 | 10/2001 | Rehberg et al. |
| 7,137,880 | B2 * | 11/2006 | Omiya .................. B60H 1/249 |
| | | | 454/162 |
| 7,182,093 | B2 | 2/2007 | Call et al. |
| 7,302,962 | B2 | 12/2007 | Blake, III et al. |
| 7,503,843 | B1 | 3/2009 | Wilmoth |
| 8,616,944 | B2 | 12/2013 | Chambo et al. |
| 8,986,086 | B2 | 3/2015 | Carlson et al. |
| 9,410,717 | B2 | 8/2016 | Marleau et al. |
| 9,592,857 | B2 | 3/2017 | Eckstein |
| 9,834,064 | B2 | 12/2017 | Wissmueller et al. |
| 10,245,922 | B2 | 4/2019 | Huet |
| 2009/0280736 | A1 | 11/2009 | Schneider |
| 2013/0095738 | A1 | 4/2013 | Marleau et al. |
| 2016/0121692 | A1 * | 5/2016 | Porter ................. B29C 45/0081 |
| | | | 454/165 |
| 2019/0152296 | A1 | 5/2019 | Lefever et al. |
| 2019/0315198 | A1 | 10/2019 | Daly et al. |
| 2020/0062084 | A1 | 2/2020 | Porter et al. |
| 2020/0189359 | A1 | 6/2020 | Barnes et al. |
| 2020/0263801 | A1 | 8/2020 | Sterbenz et al. |

FOREIGN PATENT DOCUMENTS

| | | | |
|---|---|---|---|
| EP | 0915302 | A2 | 5/1999 |
| WO | 9836924 | A1 | 8/1998 |
| WO | 2017095363 | A1 | 6/2017 |

* cited by examiner

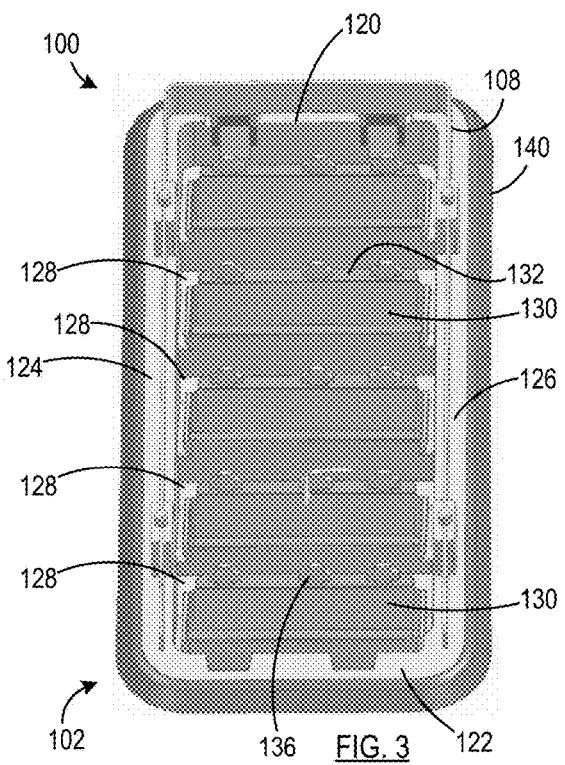
FIG. 3
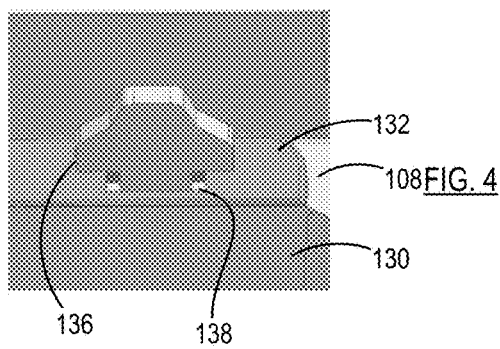
FIG. 4
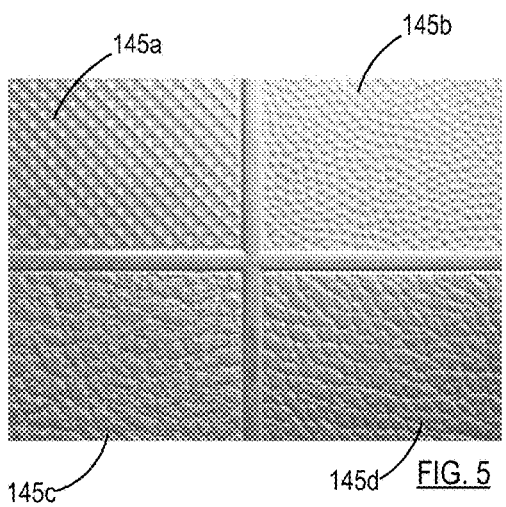
FIG. 5
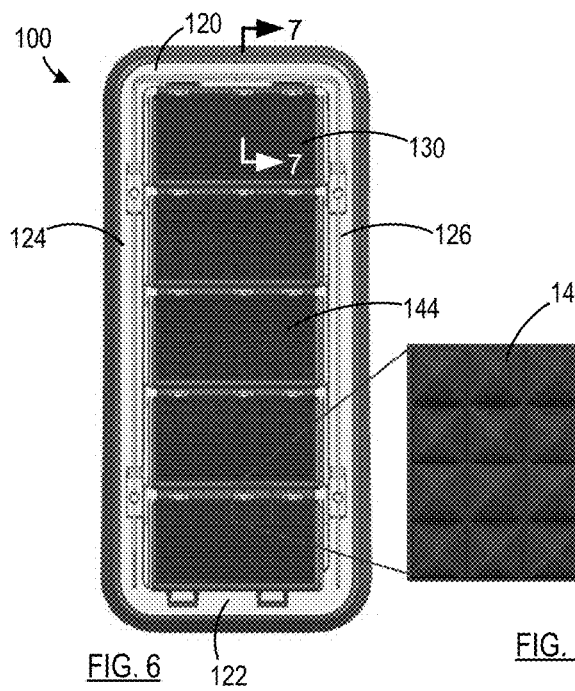
FIG. 6
FIG. 6A
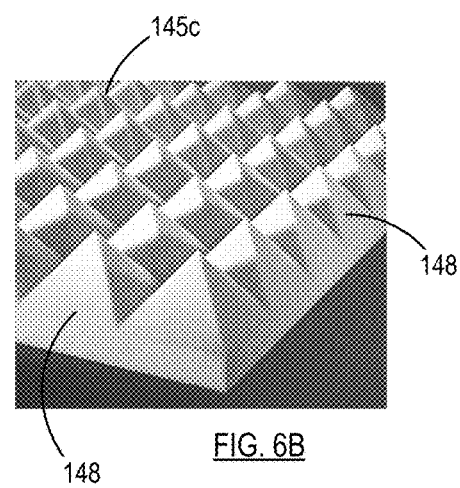
FIG. 6B

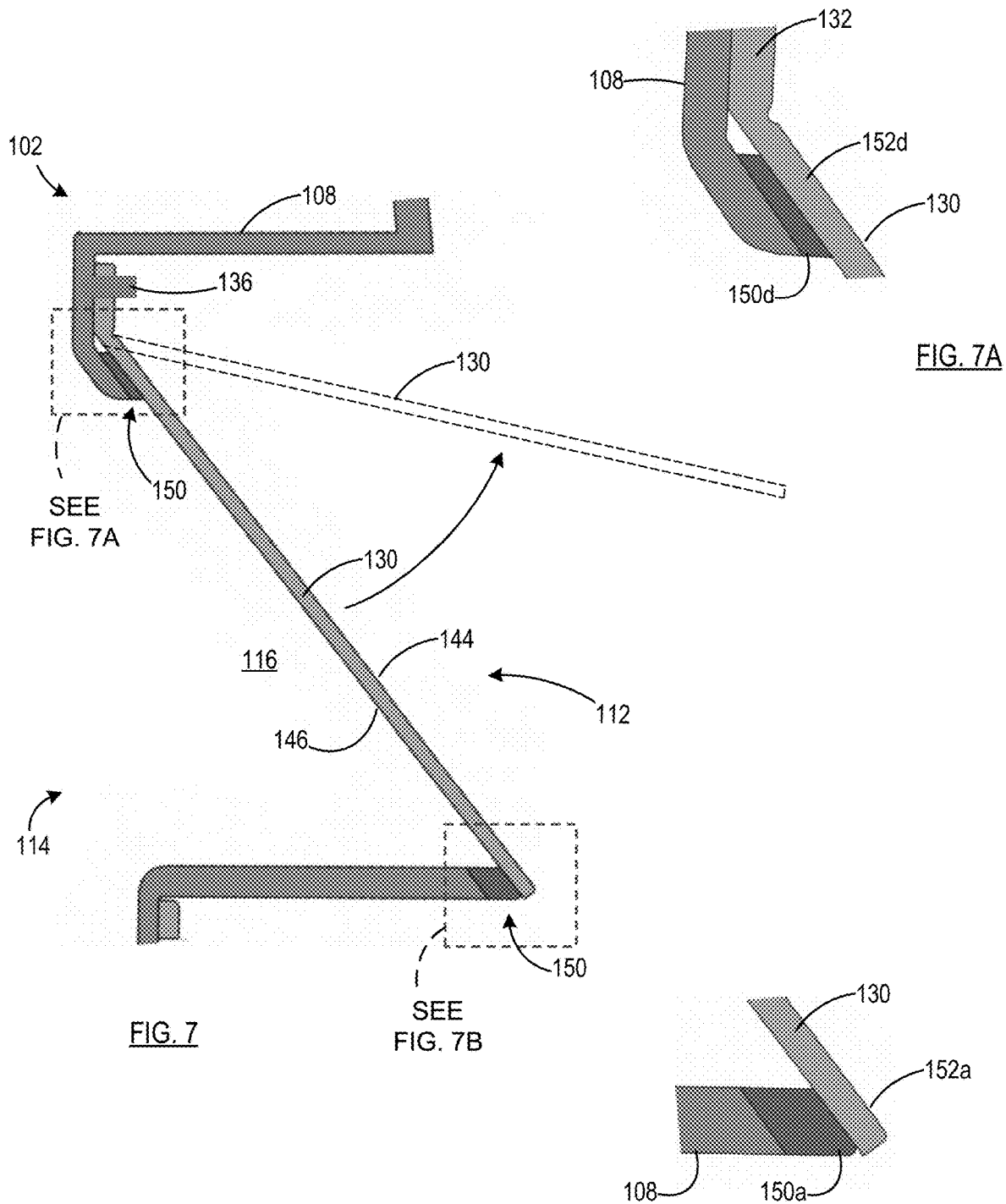

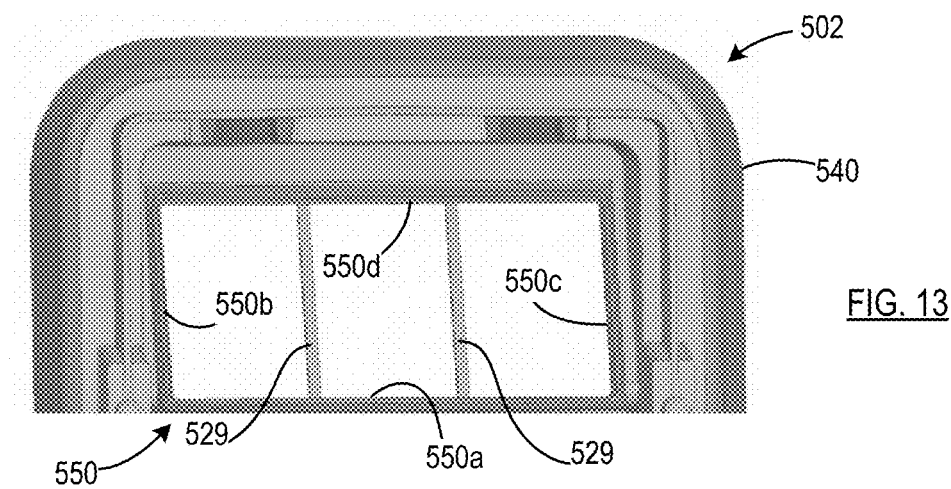
FIG. 13
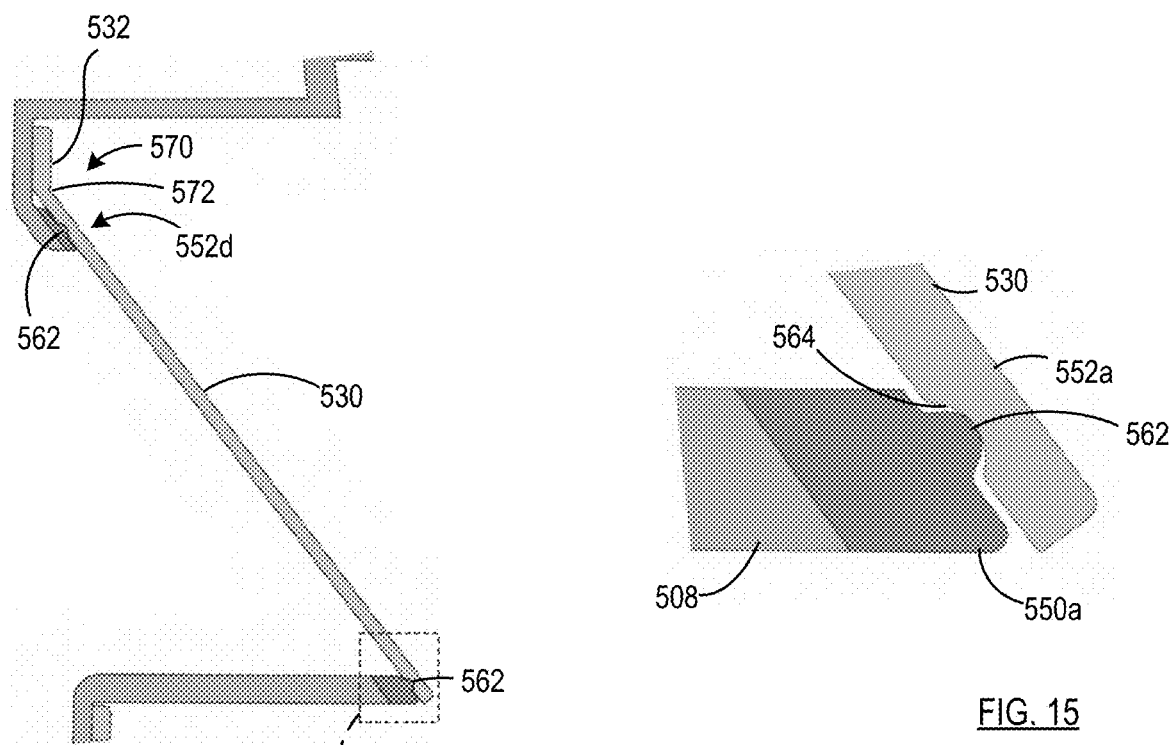
FIG. 14
FIG. 15

INJECTION MOLDED VEHICLE COMPARTMENT PRESSURE RELIEF VALVE

CROSS-REFERENCE TO RELATED APPLICATIONS

This application is a continuation of PCT/CA2022/051460, filed Sep. 30, 2022, which claims the benefit of priority to U.S. Provisional Application No. 63/261,996, filed Oct. 1, 2021, each of which is hereby incorporated herein by reference in its entirety.

FIELD

The present specification relates to vehicle compartment pressure relief valves, and more particularly, to injection molded pressure relief valve devices for relieving pressure inside a vehicle compartment.

BACKGROUND

U.S. Pat. No. 6,210,266 (Barton) discloses a flap-type pressure relief valve for venting of pressure out of, for example, an automobile passenger compartment that has a flap assembly manufactured by a co-molding operation and inserted into a valve housing to block the flow of air therethrough. The valve flap assembly includes a flap carrier frame formed from a relatively rigid plastic in the first shot of a two-shot co-molding process, and at least one flap formed from a relatively flexible plastic in the second shot. The co-molding joins the flap to a first perimeter wall of the frame along an edge of the flap, and the flap is sufficiently flexible to bend about a line adjacent the edge. In a two flap version, a second flap co-molded into connection with a second perimeter wall of the frame. The resulting flap assembly can be easily connected with the separately molded valve housing by securing the frame to the housing such that the flaps are positioned over valve seat within the housing. The flaps are co-molded into connection with the frame such that when the frame is secured to the housing to position the flaps over the air passages, the flaps are bent away from the as-molded configurations, thereby generating elastic force urging the flaps toward the respective valve seats.

U.S. Pat. No. 5,105,849 (Clough) discloses a valve for use in ventilation of the passenger compartment of a motor vehicle that comprises a housing defining a plurality of through flow passages with separate flap valve elements pivotally mounted adjacent each through flow passage. The valve elements are adapted in a first position to overlie the associated through flow passage for blocking flow, but when pivoted toward a second position, they open to permit flow. The flap valve elements are each pivotally mounted by separate hinges which act to bias the valve elements toward the first position with a preselected force. The hinges on separate ones of the flap valve elements are arranged to provide different preselected biasing forces such that the number of valve elements moving toward the open position at any point in time depends upon the then current level of pressure of fluid on the upstream side of the valve.

U.S. Pat. App. Pub. No. 2020/0062084 (Porter et al.) discloses a ventilation module for a vehicle having a housing including a flap hingedly secured along an inner edge to the housing to extend across its open interior. The flap includes side edges and an interconnecting outer edge which contact, in a closed flap condition, support locations configured along the housing to define its open interior. One or more fingers extend from at least one of the side and outer edges of the flap so that the fingers abut standoff locations of the housing located in proximity to the support locations. Upon a sufficient positive air pressure condition created within the passenger compartment which overcomes a holding force exerted by the fingers against said standoffs, the flap is allowed to open in a controlled fashion to vent to the exterior the excess air pressure, until reclosing upon achieving an air equilibrium condition.

SUMMARY

The following summary is intended to introduce the reader to various aspects of the applicant's teaching, but not to define any invention.

According to some aspects of the teaching disclosed herein, a pressure relief valve apparatus for a vehicle compartment includes: (a) a housing having an injection molded frame for mounting in an aperture in a vehicle panel. The frame has an exterior face, an interior face opposite the exterior face, and at least one flow opening extending between the exterior face and the interior face. The valve apparatus further includes (b) at least one injection molded flap. Each flap has a flap connection portion joined to the frame adjacent an upper edge of a respective flow opening. Each flap is pivotable between a closed position in which the respective flow opening is blocked by the flap, and an open position in which the respective flow opening is unblocked for permitting pressurized air at the interior face of the frame to vent through the flow opening.

In some examples, the housing includes a respective valve seat around each flow opening. When in the closed position, each flap is in sealed engagement with the respective valve seat to block the respective flow opening. When in the open position, each flap is spaced apart from the respective valve seat to unblock the respective flow opening.

In some examples, the frame is formed of a first polymer material in an injection molding process. In some examples, each valve seat is formed of a second polymer material integrally with the frame in the injection molding process. In some examples, the second polymer material is softer than the first polymer material. In some examples, the frame is formed in a first shot of the injection molding process, and each valve seat is formed in a second shot in the injection molding process.

In some examples, the housing has an outer peripheral seal for bearing against the vehicle panel around the aperture. In some examples, the outer peripheral seal is formed integrally with the frame in the injection molding process. In some examples, the outer peripheral seal is formed of the second polymer material in the second shot of the injection molding process.

In some examples, each flap has a seal portion extending along outer edges of the flap and bearing against the respective valve seat when the flap is in the closed position. In some example, the seal portion is formed of the second polymer material.

In some examples, each flap has a flap body formed of the first polymer material for covering the respective flow opening, and the seal portion of the flap is formed integrally with the flap body in the injection molding process.

In some examples, the exterior face of the frame comprises at least one lip, each lip defining a raised peripheral edge circumscribing a respective flow opening and along which the respective valve seat extends. In some examples, each flap has an interior face directed toward the frame, the interior face having an endwall surface for covering the respective flow opening and a sidewall surface projecting inwardly toward the frame from a periphery of the endwall surface to the outer edges of the flap. In some examples, the seal portion comprises the sidewall surface and a portion of the endwall surface adjacent the sidewall surface.

In some examples, the flap has an interior bounded by the endwall and sidewall surfaces. The interior is open inwardly toward the frame for receiving the respective valve seat in a nested, sealed fit with the seal portion when the flap is in the closed position.

In some examples, the valve apparatus further includes at least one retention device. Each retention device is for retaining a respective flap in the closed position and accommodating movement of the flap toward the open position in response to the pressurized air exerting an opening force on the flap sufficient to overcome an opposing retention force exerted by the retention device. In some examples, the retention device comprises a spring mounted to the frame and biasing the flap toward the closed position.

In some examples, the flap connection portion is joined mechanically to the frame through a hinge connection for pivoting of the flap between the open and closed positions. In some examples, the hinge connection comprises a pair of trunnions projecting laterally from opposite sides of the flap connection portion and received in corresponding slots fixed to the frame adjacent the upper edge of the respective flow opening.

In some examples, the frame and the at least one flap are integrally formed in the injection molding process. In some examples, the at least one flap is formed entirely of the second polymer material. In some examples, the frame is formed in a first shot in the injection molding process, and the at least one flap is formed in a second shot in the injection molding process, with the flap connection portion of each flap over-molded onto the frame adjacent the upper edge of the respective flow opening. In some examples, each valve seat is formed in the second shot of the injection molding process. In some examples, the housing has an outer peripheral seal for bearing against the vehicle panel around the aperture, the outer peripheral seal formed of the second polymer material integrally with the frame in the second shot of the injection molding process.

In some examples, each valve seat includes a bead projecting outwardly from the frame, and each flap includes a groove for receiving the bead of a respective valve seat when in the closed position.

In some examples, each flap has a flap upper portion adjacent the flap connection portion and a flap lower end opposite the flap upper end, and the flap has a flap thickness of the second polymer material extending between an interior face of the flap and an exterior face of the flap, the flap thickness greater at the flap lower end than at the flap upper end to facilitate holding the flap in the closed position by gravity. In some examples, the flap thickness is tapered when viewed in cross section, from a narrower thickness at the flap upper end to a wider thickness at the flap lower end.

In some examples, the flap includes a living hinge proximate the flap connection portion, the flap pivotable about the living hinge between the open and closed positions. In some examples, the living hinge extends horizontally between opposed side edges of the flap and includes an arcuate segment that, in cross-section, protrudes convexly away from the frame between an upper hinge edge adjacent the flap connection portion and a lower hinge edge spaced vertically below the upper hinge edge. The arcuate segment is resiliently movable from an expanded state to a collapsed state when the flap is moved from the closed position to the open position. The arcuate segment is biased to the expanded state for urging the flap to the closed position. In some examples, a gap is provided between the frame and a back surface of the arcuate segment of the living hinge. The gap facilitates positive engagement of the flap against a valve seat upper surface of the valve seat above the respective flow opening when the flap is in the closed position.

In some examples, each flap has a flap upper portion adjacent the flap connection portion and a flap lower portion opposite the flap upper portion. The flap lower portion bearing against a valve seat lower surface of the respective valve seat adjacent a lower edge of the flow opening when the flap is in the closed position. The flap further includes a flap return extending below the valve seat lower surface of the housing and protruding inwardly from an interior surface of the flap. The flap return further inhibiting liquid intrusion though the respective flow opening when the flap is closed.

In some examples, each flap return extends generally orthogonally from the flap interior surface in a direction away from a flap exterior surface of the flap, the flap exterior surface opposite the flap interior surface. The flap lower portion and the flap return generally form a "J-shape" when viewed in cross-section.

In some examples, each valve seat includes a valve seat upper surface adjacent an upper edge of the respective flow opening, a valve seat lower surface adjacent a lower edge of the flow opening, and a pair of spaced-apart valve seat side surfaces extending between the valve seat upper and lower surfaces and adjacent opposed side edges of the flow opening. The valve seat upper surface and valve seat lower surface are aligned in an opening plane that is inclined to the vertical, with the valve seat lower surface positioned further outward relative to the valve seat upper surface. In some examples, the valve seat side surfaces are curved outwards relative to the opening plane, with upper and lower ends of each valve seat side surface generally positioned in the opening plane, and a vertically middle portion of each valve seat side surface protruding outward of the opening plane. As the respective flap moves from the open position to the closed position, the flap engages the valve seat side surfaces progressively, from the upper ends to the lower ends of the valve seat side surfaces to reduce noise generated when the flap moves into the closed position.

In some examples, each flap has an exterior surface textured with a pattern of protrusions for enhancing noise reduction by dissipating sound energy.

In some examples, each valve seat comprises a valve seat lower surface adjacent a lower edge of the respective flow opening for engagement with a flap lower portion of the flap when in the closed position. The valve seat lower surface and the flap lower portion comprising respective tongues and grooves for inter-engaging with each other when the flap is in the closed position.

In some examples, the flap connection portion of each flap is provided with a plurality of flap apertures for receiving respective retaining protrusions extending from the housing along the upper edge of the flow opening to assemble the flap to the housing.

In some examples, the at least one flow opening comprises a plurality of the flow openings, and the at least one flap comprises a plurality of the flaps equal in quantity to the plurality of the flow openings, each flap for blocking and unblocking a respective flow opening.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 3 is a front (exterior) view of the valve apparatus of FIG. 1;

FIG. 4 is an enlarged view of a portion of the valve apparatus of FIG. 3;

FIG. 5 is a view of alternative protrusion patterns for an exterior surface of flap portions of the valve apparatus of FIG. 1;

FIG. 6 is a front (exterior) view of the valve apparatus of FIG. 1, with another protrusion pattern on the exterior surface of the flaps;

FIG. 6A is an enlarged view of a portion of an exterior surface of a flap member of FIG. 6;

FIG. 6B is a perspective view of the structure of FIG. 6A;

FIG. 7 is a cross-sectional view of a portion of the valve apparatus of FIG. 6, taken along the lines 7-7;

FIG. 7A is an enlarged portion of the structure of FIG. 7;

FIG. 7B is another enlarged portion of the structure of FIG. 7;

FIG. 13 is an enlarged exterior view of a portion of a housing portion of the valve apparatus of FIG. 9;

FIG. 14 is a cross-sectional view similar to that of FIG. 12, with additional optional engagement features;

FIG. 15 is an enlarged view of a portion of the structure of FIG. 14;

DETAILED DESCRIPTION

Various articles, apparatuses, or processes will be described below to provide an example of an embodiment of each claimed invention. No embodiment described below limits any claimed invention and any claimed invention may cover articles, processes, or apparatuses that differ from those described below. The claimed inventions are not limited to articles, apparatuses, or processes having all of the features of any one article, apparatus, or process described below or to features common to multiple or all of the articles, apparatuses, or processes described below. It is possible that an article, apparatus, or process described below is not an embodiment of any claimed invention. Any invention disclosed in an article, apparatus, or process described herein that is not claimed in this document may be the subject matter of another protective instrument, for example, a continuing patent application, and the applicants, inventors, or owners do not intend to abandon, disclaim, or dedicate to the public any such invention by its disclosure in this document.

The present disclosure provides solutions that address shortcomings in known pressure relief valves for relieving pressure in vehicle compartments. Such pressure relief valves typically include a flap over an opening that, when the flap is in an open position, allow pressurized air in the vehicle compartment to vent to atmosphere through the opening. This can help relieve unwanted pressure build-up inside the vehicle compartment caused by, for example, delivery of air into the compartment by the vehicle's HVAC system, or the fast closure of doors or deck lids, etc. When the flap is in the closed position, the opening is covered by the flap to inhibit reverse flow through the opening. This can prevent unwanted entry of external air or moisture into the vehicle compartment.

Known pressure relief valves are often formed of multiple parts that must be assembled together using various fasteners. This adds cost and quality concerns caused by variability in the multiple parts and in the assembly process. Known valves also frequently result in unwanted noise in the vehicle, caused by rattling of the flap when moving in and out of the fully closed position. In some known designs, the flap does not seal sufficiently in the closed position, which can allow road noise, unconditioned external air, and water to enter the vehicle compartment.

Figure 1:
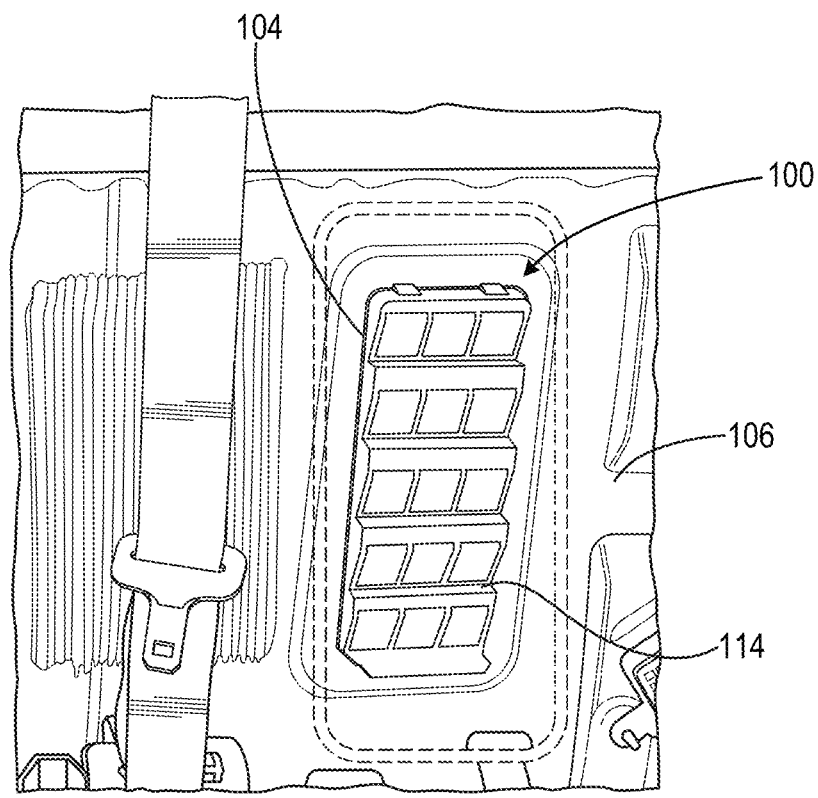
FIG. 1 is a rear (interior) perspective view a pressure relief valve apparatus mounted in a vehicle panel and viewed from the interior of a vehicle compartment.
Figure 2:
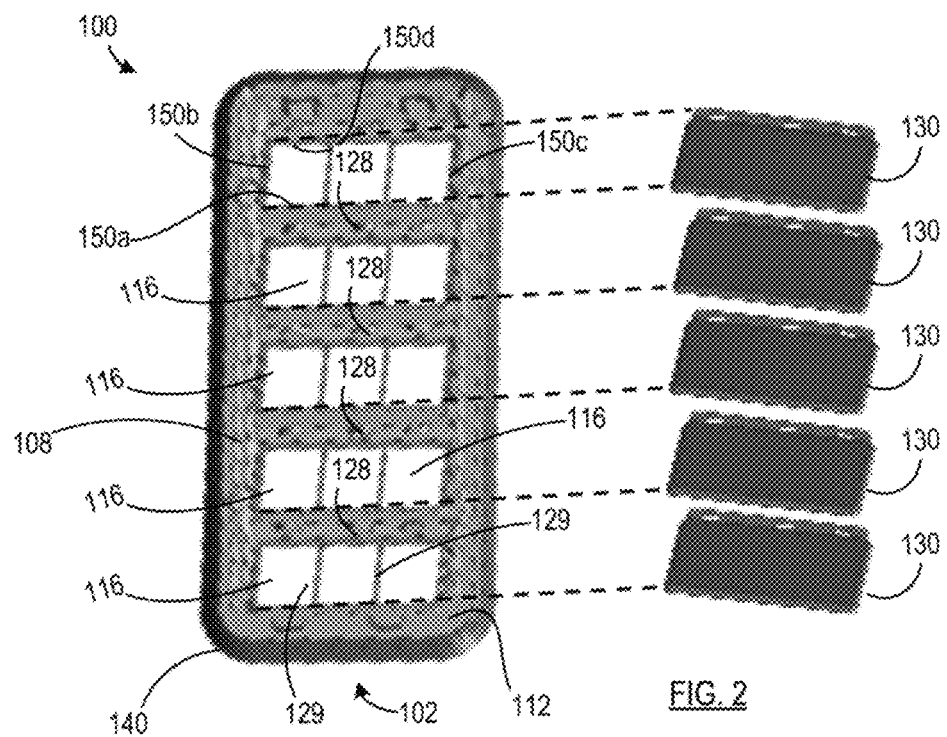
FIG. 2 is an exploded front (exterior) view of the valve apparatus of FIG. 1.

Referring to FIGS. 1 and 2, a pressure relief valve apparatus 100 is shown for venting air from a vehicle compartment. The valve apparatus 100 includes a housing 102 for mounting in an aperture 104 in a vehicle panel 106. In the example illustrated, the panel 106 is located behind the rear seat of the vehicle, with the pressure relief valve apparatus 100 mounted in the panel 106 for venting pressurized air from inside the cabin to the external environment.

In the example illustrated, the housing 102 is of one-piece construction, formed by injection molding. Injection molding the housing 102 may be performed in a single shot process or a multi-shot process. In the example illustrated, the housing 102 includes an injection molded frame 108 having an exterior face 112 (FIG. 2), an interior face 114 (FIG. 1) opposite the exterior face 112, and at least one flow opening 116 extending between the exterior face 112 and the interior face 114. In the example illustrated, the frame 108 has a plurality of flow openings 116 extending between the exterior face 112 and the interior face 114. The interior face 114 is configured to be exposed to an internal environment inside the vehicle compartment, and the exterior face 112 is configured to be exposed to an external environment outside the vehicle compartment.

With reference to FIGS. 2 and 3, the flow openings 116 may be separated from one another by vertical and/or horizontal rails extending between opposed peripheral portions of the frame 108. In the example illustrated, the frame 108 has an upper frame member 120 and a lower frame member 122 spaced vertically below the upper frame member 120, each of the upper and lower frame members extending horizontally between a frame first side member 124 and a frame second side member 126. The frame 108 further includes four horizontal rails 128 spaced apart vertically between the upper and lower frame members 120, 122 to divide the frame interior into five flow openings. Furthermore, in some examples the frame 108 optionally includes one or more horizontal and/or vertical support ribs extending across the flow openings. In the example illustrated, two vertical support ribs 129 span the vertical extent of each flow opening 116, at horizontally spaced-apart positions.

The valve apparatus 100 further comprises at least one injection molded flap 130. In the example illustrated, the valve apparatus 100 comprises a plurality of injection molded flaps 130 equal in quantity to the plurality of flow openings 116. In the example illustrated, the apparatus 100 has five flaps 130, one flap 130 for each flow opening 116. Each flap 130 is of one-piece construction formed by injection molding. Injection molding the flaps 130 may be performed in a single shot or multi-shot injection molding process. In the example illustrated, the flaps 130 are formed in an injection mold separate from the frame 108, and in a post-mold operation, the flaps 130 are mechanically assembled to the frame 108. In some examples, injection molding of the flaps 130 may include the injection molded frame 108, providing a pressure relief valve that is formed as a one-piece, unitary injection molded article requiring no post-mold mechanical assembly of the flaps and housing.

With reference also to FIG. 4, in the example illustrated, each flap 130 has a flap connection portion 132 joined to the frame 108 adjacent an upper edge of a respective flow opening 116. Each flap 130 is pivotable between a closed position (e.g. shown in solid line in FIG. 7) in which the respective flow opening 116 is blocked by the flap 130, and an open position (e.g. shown in phantom in FIG. 7) in which the respective flow opening 116 is unblocked for permitting pressurized air at the interior face 114 of the frame 108 to vent to the exterior face 112 through the flow opening 116.

In the example illustrated, the frame 108 is formed of a first polymer material. The first polymer material is sufficiently rigid to provide structural (dimensional) stability to the housing 102. In the example illustrated, the first polymer material is a polypropylene material. More particularly, in the example illustrated, the first polymer material is a polypropylene homopolymer that is talc filled and heat stabilized.

In the example illustrated, the flaps 130 are of a second polymer material, the second polymer material softer than the first polymer material. The second polymer material is resiliently flexible to facilitate sealing of the flap with adjacent surfaces when in the closed position. In the example illustrated, the second polymer material is a thermoplastic vulcanizate material. In some examples, the second polymer material can comprise one or more of an EPDP, elastomer, and a polyolefin.

With reference again to FIGS. 3 and 4, in the example illustrated, the housing 102 includes a plurality of retaining protrusions 136 integrally molded with the frame 108. The retaining protrusions 136 protrude outwardly from the exterior face 112 of the frame 108 along the upper edge of each flow opening 116 (see also FIG. 7). The flap connection portion 132 of each flap 130 is provided with a plurality of flap assembly apertures 138, each flap assembly aperture 138 for receiving a respective retaining protrusion 136 to assemble the flaps 130 to the housing 102 (see FIG. 4). In the example illustrated, three retaining protrusions 136 are provided in spaced-apart relation along the upper edge of each flow opening 116 of the frame 108, and each flap 130 has three flap assembly apertures 138 along the flap connection portion 132, each assembly aperture 138 receiving a respective retaining protrusion 136 therethrough.

Referring again to FIGS. 2 and 3, in the example illustrated, the housing 102 optionally includes an outer peripheral seal 140 for bearing against the vehicle panel 106 around the panel aperture 104. The peripheral seal 140 can help seal any gaps between the frame 108 and the panel 106 that may otherwise permit undesired external air, liquid, or noise to enter the interior compartment. The peripheral seal 140 can be formed of a softer, more resiliently flexible material than the material of which the frame 108 is formed. In some examples, the outer peripheral seal 140 can be formed of the same material (e.g. the second polymer material) from which the flaps 130 are formed. In the example illustrated, the outer peripheral seal 140 is integrally formed with the frame 108 in the injection mold for producing the housing 102. The frame 108 is formed in a first shot, and the outer peripheral seal 140 is formed in a second shot of a multi-shot injection molding process.

Referring to FIGS. 5 and 6, each flap 130 has an exterior surface 144 opposite an interior surface 146, and in some examples the exterior surface 144 is textured with a pattern 145 of protrusions for enhancing noise reduction by dissipating sound energy. Exemplary patterns include a first pattern 145a characterized by a diamond gridwork; a second pattern 145b characterized by small raised bumps of various shapes spaced apart from one another; a third pattern 145c arranged in a brushed bushrock pattern; and a fourth pattern 145d arranged in a more clearly delimited bushrock pattern. Referring to FIGS. 6, 6A, and 6B, in the example illustrated, the exterior surface 144 of the flap 130 is provided with a protrusion pattern 145e including an array of pyramids 148 protruding from the exterior surface of the flap 130.

With reference now to FIG. 7, in some examples, the housing 102 includes respective valve seats 150 around each flow opening 116 for engaging outer margins of the respective flap 130 when in the closed position. In some examples, the valve seats 150 are integrally formed with the frame 108 in the injection molding process. In the example illustrated, each valve seat 150 includes a resiliently flexible material that is softer than the material from which the frame 108 is formed. The housing 102 is, in the example illustrated, formed in a multi-shot injection molding process in which the frame 108 is formed in a first shot that injects the first polymer material, and the valve seats 150 are over-molded onto the frame 108 in a second shot that injects the second polymer material.

Referring now also to FIG. 7B, each valve seat 150 includes a valve seat lower surface 150a adjacent a lower edge of each flow opening 116 for engagement with a flap lower portion 152a of the respective flap 130 when in the closed position. Having a softer material along the valve seat lower surface 150a can reduce noised caused by the flap 130 contacting the valve seat lower surface 150a when the flap 130 moves from the open position (shown in phantom line in FIG. 7) to the closed position. The softer valve seat material can also facilitate forming a leak-proof seal between the flap 130 and the housing 102 when the flap is closed, to help keep out unwanted air, water, and noise from entering the interior compartment from the exterior environment via the flow openings 116.

In the embodiment illustrated, each valve seat 150 further includes optional valve seat side surfaces 150b, 150c (FIG. 2) extending along each side edge of the flow opening 116, and an optional valve seat upper surface 150d extending along an upper edge of each flow opening 116 (FIG. 7A). The flap 130 includes a flap upper portion 152d for bearing against the valve seat upper surface 150d when closed.

Figure 8:
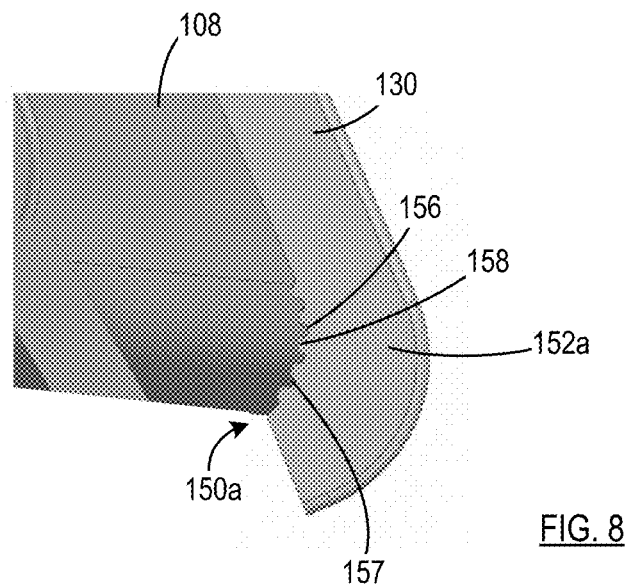
FIG. 8 shows structure similar to that of FIG. 7B, with additional optional engagement features.
Figure 8A:
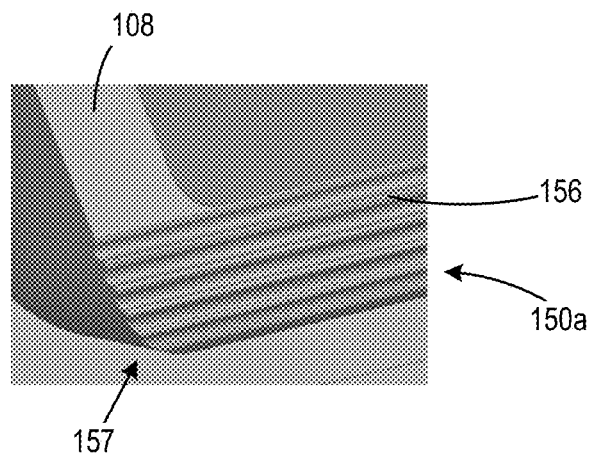
FIGS. 8A and 8B are perspective views of the structure of FIG. 8.
Figure 8B:
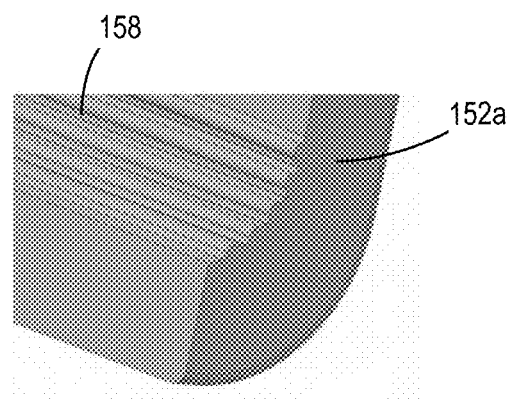

Referring to FIG. 8, in some examples, at least some portions of the valve seats 150 can include optional geometrical features to further enhance sealing action between the valve seats 150 and engaged surfaces of the flap 130 when the flap 130 is closed. In the optional example illustrated, the valve seat lower surface 150a adjacent a lower edge of each flow opening 116 optionally includes a first series 156 of tongues and grooves (FIG. 8A). The first series 156 of tongues and grooves are aligned horizontally, and can extend around a convex downward curving portion 157 of the valve seat lower surface 150a (FIG. 8A). A lower marginal seal portion (flap lower portion 152a) of the flap 130 can be provided with a second series of tongues and grooves 158 (FIG. 8B) for inter-engaging with the first series 156 of tongues and grooves of the valve seat lower surface 150a when the flap is in the closed position.

Figure 9:
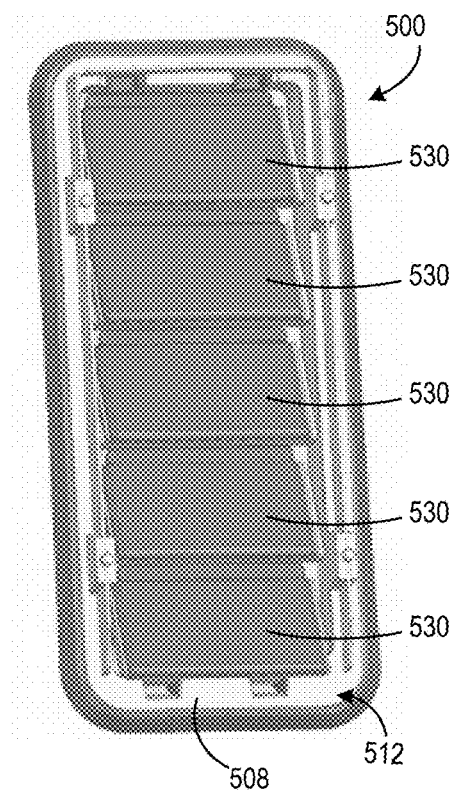
FIG. 9 is an exterior perspective view of another valve apparatus.
Figure 10:
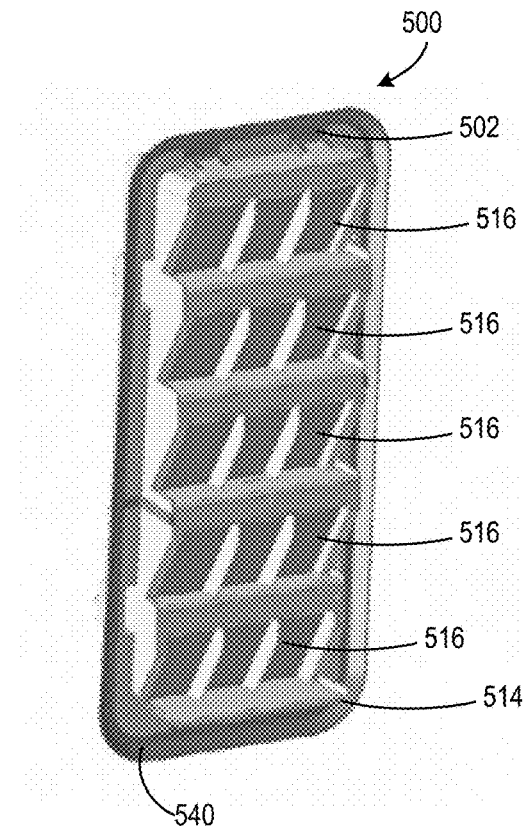
FIG. 10 is an interior perspective view of the valve apparatus of FIG. 9.

Referring to FIGS. 9 and 10, another example of a pressure relief p valve apparatus 500 is shown for venting air from a vehicle compartment. The pressure relief valve apparatus 500 is similar to the pressure relief valve apparatus 100, and like features are identified by like reference characters, incremented by 400.

Figure 11:
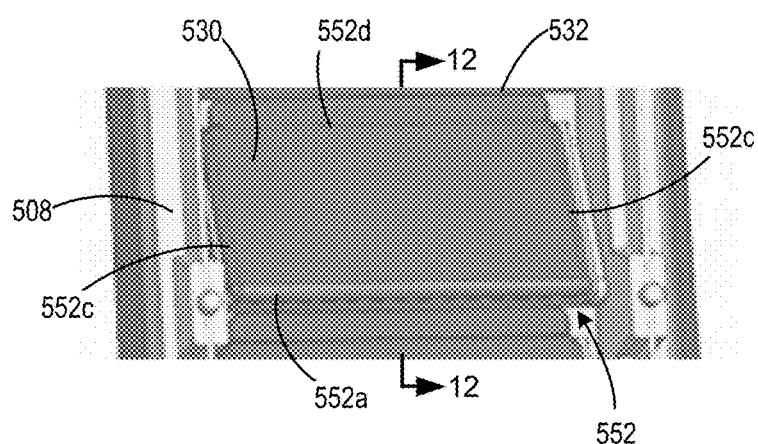
FIG. 11 is an enlarged view of a portion of the valve apparatus of FIG. 9.
Figure 12:
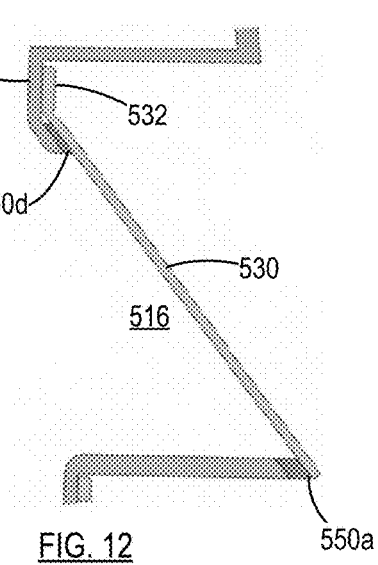
FIG. 12 is a cross-sectional view of a portion of the valve apparatus of FIG. 11, taken along the lines 12-12.

The pressure relief valve apparatus 500 includes a housing 502 having an injection molded frame 508 with an exterior face 512 (shown in FIG. 9), an interior face 514 (FIG. 10) opposite the exterior face 512, and a plurality of flow openings 516 extending between the exterior face and the interior face. The valve apparatus 500 further includes a plurality of injection molded flaps 530 equal in quantity to the plurality of flow openings 516, each flap 530 having a flap connection portion 532 (FIG. 11, 12) joined to the frame 508 adjacent an upper edge of a respective flow opening 516. Each flap 530 is pivotable between a closed position in which the respective flow opening 516 is blocked by the flap 530, and an open position in which the respective flow opening 516 is unblocked for permitting pressurized air at the interior face 514 of the frame 108 to vent through the flow opening 516.

In the example illustrated, the frame 508 is of a first polymer material, and the flaps 530 are of a second polymer material, the second polymer material softer than the first polymer material. In the valve apparatus 500, the first polymer material and the second polymer material are the same as those of the valve apparatus 100.

In the example illustrated, the housing 502 and flaps 530 are integrally formed in an injection molding process. More particularly, the valve apparatus 500 is formed of one-piece, unitary construction by injection molding in a multi-shot injection molding process. The frame 508 is formed in a first shot in the injection molding process, and the flaps 530 are formed in a second shot in the injection molding process with the flap connection portion 532 of each flap overmolded onto the frame 508 adjacent the upper edge of the respective flow opening 516. In the example illustrated, the flap connection portion 532 is free of any mechanical retainers (FIG. 11) to secure the flaps 530 to the housing 502.

In the example illustrated, the housing 502 includes an optional outer peripheral seal 540 (see also FIG. 16) for bearing against the vehicle panel 106 around the panel aperture 504. The outer peripheral seal 540 is, in the example illustrated, integrally formed with the frame 508 in the injection molding process. In the example illustrated, the outer peripheral seal 540 is formed of the second polymer material in the second shot of the injection molding process.

Referring again to FIG. 11, in the example illustrated, each flap 530 has a marginal seal portion 552 extending along outer edges of the flap 530. The marginal seal portion bears against the frame 508 when the flaps are in the closed position. The marginal seal portion 552 includes, in the example illustrated, a flap lower portion 552a, a flap first side portion 552b, a flap second side portion 552c, and a flap upper portion 552d adjacent the flap connection portion 532.

With reference to FIG. 13, in the example illustrated, the housing 502 optionally includes respective valve seats 550 around each flow opening 516 for sealed engagement with the respective flap 530 when in the closed position, and in the example illustrated, for sealed engagement with the marginal seal portion 552 of the flap 530. In the embodiment illustrated, each valve seat 550 includes a valve seat lower surface 550a adjacent a lower edge of each flow opening 516 for engagement with the flap lower portion 552a of the respective flap 530 when in the closed position. Each valve seat 550 further includes, in the example illustrated, optional valve seat side surfaces 550b, 550c extending along each side edge of the flow opening 516, and an optional valve seat upper surface 550d extending along an upper edge of each flow opening 516.

In the example illustrated, the valve seats 550 are integrally formed with the housing 502 in the injection molding process. In the example illustrated, the valve seats 550 are formed of the second polymer material in the second shot of the injection molding process.

Referring to FIGS. 14 and 15, in some examples one or more portions of the valve seat 550 optionally includes a bead 562 projecting outwardly from the frame (toward the exterior). Each flap optionally includes a groove 564 for receiving the bead 562 when in the closed position. Engagement of the bead 562 and groove 564 can facilitate providing a leak-proof seal between the flap 530 and the housing 502 when the flap 530 is in the closed position.

Figure 16:
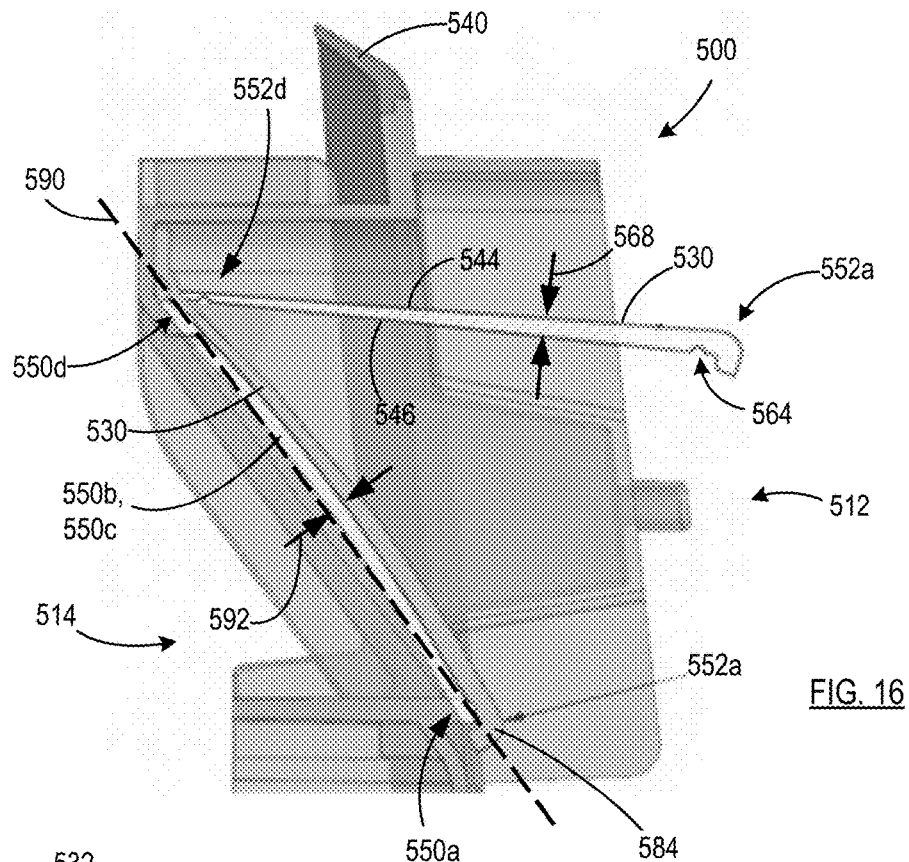
FIG. 16 is a cross-sectional view similar to that of FIG. 12, with additional optional engagement features.
Figure 17:
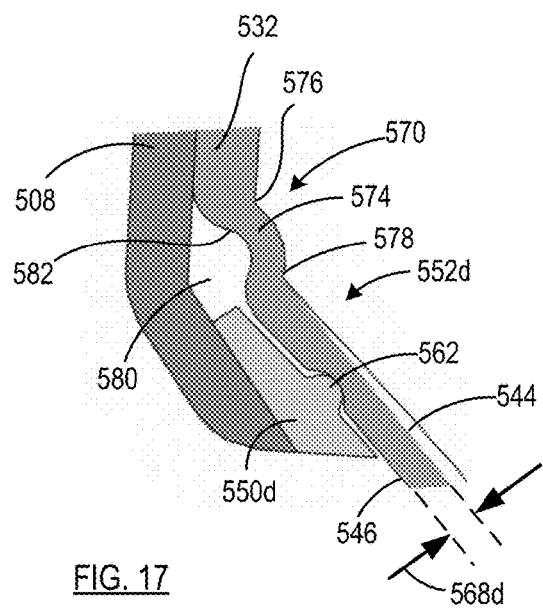
FIGS. 17 and 18 are enlarged views of respective portions of the structure of FIG. 16.

With reference to FIG. 16, each flap has a flap thickness 568 of the second polymer material extending between an interior face 546 of the flap 530 and an exterior face 544 of the flap 530. In the example illustrated, the flap thickness 568 is optionally greater (wider flap thickness 568a—see FIG. 18) at the flap lower portion 552a than at the flap upper portion 552d (corresponding to narrower flap thickness 568d—see FIG. 17). Increased flap thickness at the lower portion 552a can facilitate holding the flap 530 in the closed position by gravity, which can help inhibit unwanted air, water, or noise from leaking into the vehicle compartment past the flap when in the closed position. In the example illustrated, the flap thickness is tapered when viewed in cross section, from the narrower flap thickness 568d at the flap upper portion 552d to the wider flap thickness 568a at the flap lower portion 552a.

Referring again to FIG. 14, in the example illustrated, each flap 530 comprises a living hinge 570 proximate the flap connection portion 532. The flap 530 is pivotable about the living hinge 570 between the open and closed positions. In some examples, the living hinge 570 comprises a thinned section 572 of the flap material extending horizontally between opposed side edges of the flap, at a vertical position below the flap connection portion 532.

Alternately, and with reference again to FIGS. 16 and 17, in some examples the living hinge 570 extends horizontally between opposed side edges of the flap and optionally comprises an arcuate segment 574 that, in cross-section, protrudes convexly away from the frame 508 between an upper hinge edge 576 adjacent the flap connection portion 532 and a lower hinge edge 578 spaced vertically below the upper hinge edge 576. In the example illustrated, the arcuate segment 574 is resiliently movable from an expanded state to a collapsed state when the flap is moved from the closed position to the open position. The arcuate segment 574 is biased to the expanded state for urging the flap 530 to the closed position.

In the example illustrated (FIG. 17), a gap 580 is optionally provided between the frame 508 and a back surface 582 of the arcuate segment 574 of the living hinge 570. The gap 580 facilitates positive engagement of the flap upper portion 552*d* against the valve seat upper surface 550*d* of the housing 502 above the respective flow opening 516 when the flap 530 is in the closed position.

Figure 18:
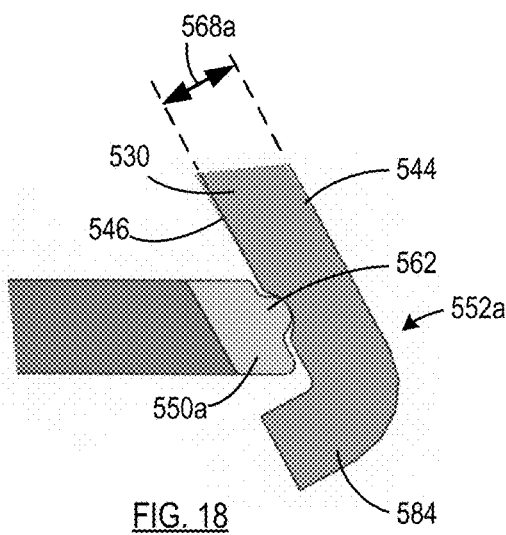

With reference to FIGS. 16 and 18, in some examples the flap lower portion 552*a* of the flap 530 optionally includes a flap return 584 extending below the valve seat lower surface 550*a* of the housing and protruding inwardly from an interior face 546 of the flap 530. The flap return 584 can help to further inhibit liquid intrusion though the flow opening 516 when the flap is closed. In the example illustrated, the optional flap return 584 extends generally orthogonally from the interior face 546 of the flap 530 in a direction away from the exterior face 544 of the flap 530. The flap lower portion 552*a* with the flap return 584 generally forms a "J-shape" when viewed in cross-section (FIG. 18).

In the example illustrated, each valve seat 550 is optionally configured to provide progressive engagement of the valve seat 550 by the flap 530 when moving to the closed position. This progressive engagement can help to further reduce noise when the valve apparatus 500 is in use. More particularly, as mentioned previously, the housing 502 includes respective valve seats 550 around each flow opening 516 for engagement with the respective flap when in the closed position. Each valve seat 550 includes a valve seat upper surface 550*d* adjacent an upper edge of each flow opening 516, a valve seat lower surface 550*a* adjacent a lower edge of each flow opening 516, and a pair of spaced-apart valve seat side surfaces 550*b*, 550*c* extending between the valve seat upper and lower surfaces 550*d*, 550*a* and adjacent opposed side edges of each flow opening 516.

In the example illustrated, the valve seat upper surface 550*d* and the valve seat lower surface 550*a* are aligned in an opening plane 590 that is inclined to the vertical, with the valve seat lower surface 550*a* positioned further outward (towards the exterior) relative to the valve seat upper surface 550*d*.

In the example illustrated, the valve seat side surfaces 550*b*, 550*c* are curved outwards relative to the opening plane 590, with upper and lower ends of each valve seat side surface generally positioned in the opening plane 590, and a vertically middle portion of each valve seat side surface 550*b*, 550*c* protruding slightly outward (towards the exterior) of the opening plane by a seat offset 592. As a result of the outwardly curved valve seat side surfaces 550*b*, 550*c*, as the flap moves from the open to closed position, the flap 530 engages the valve seat side surfaces progressively, from the upper ends to the lower ends of the valve seat side surfaces. The weight of the flap and resilient flexibility of the second polymer material cooperate to cause the flap 530 to progressively bend along the curved surface of the valve seat side surfaces as the flap moves to the closed position. This gradual, progressive engagement of the flap with the housing reduces noise generated when the flap moves into the closed position.

Figure 19:
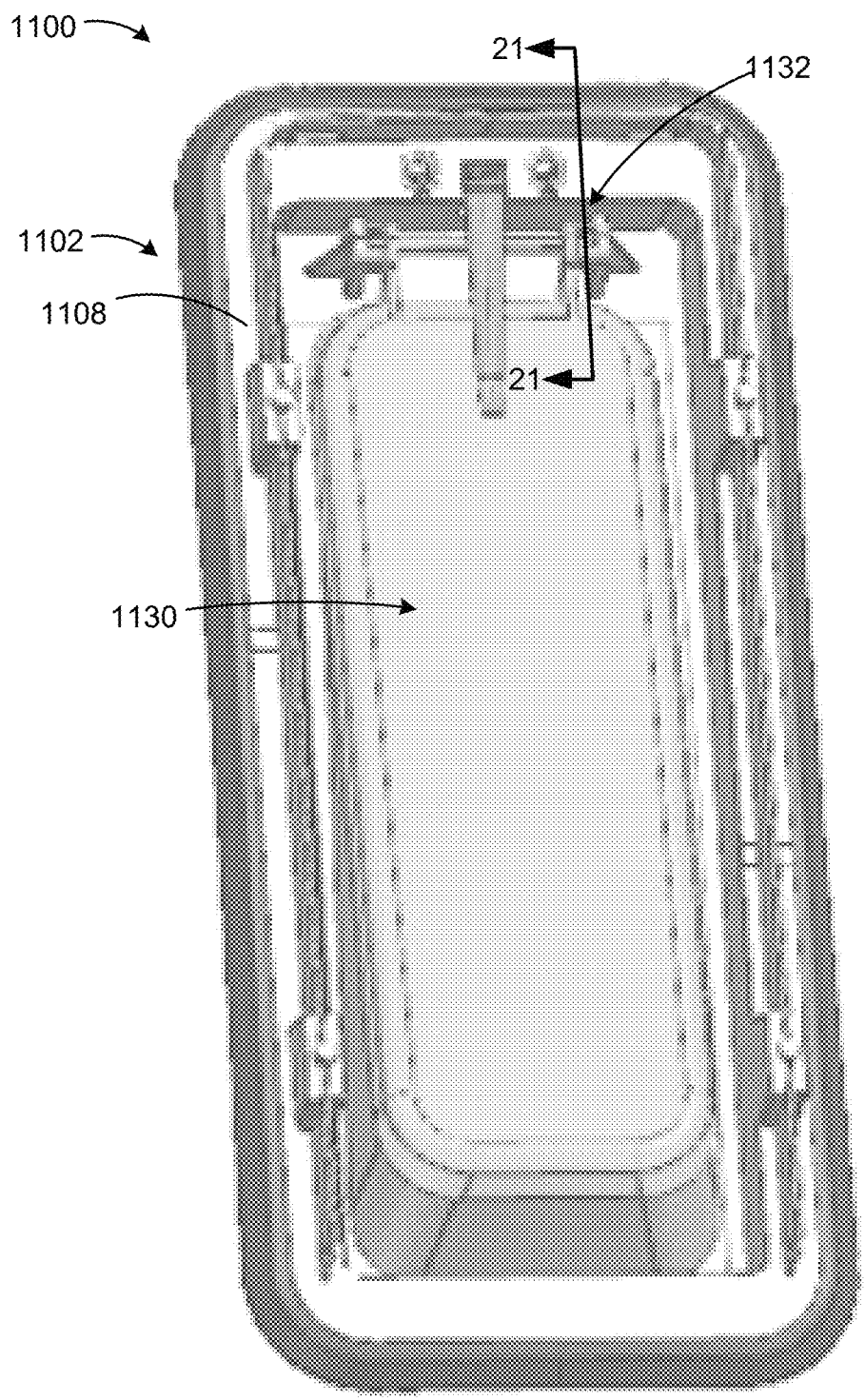
FIG. 19 is a front (exterior) perspective view of another example pressure relief valve apparatus.

Referring to FIG. 19, another example pressure relief valve apparatus 1100 is shown. The valve apparatus 1100 is similar to the valve apparatus 500, and like features are identified with like reference numerals, incremented by 600.

Figure 20:
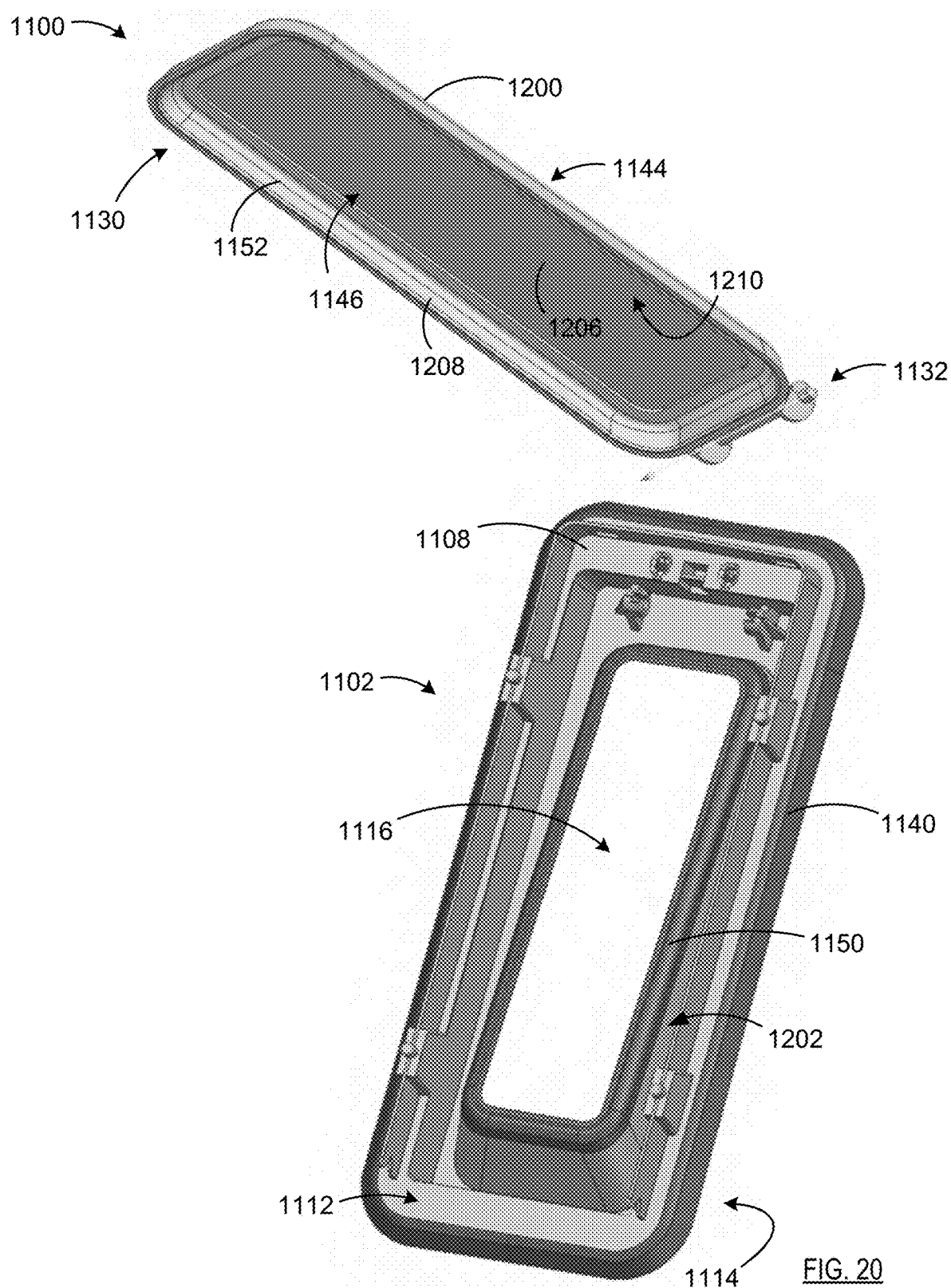
FIG. 20 is an exploded perspective view of the valve apparatus of FIG. 19.

Referring to FIG. 20, in the example illustrated, the valve apparatus 1100 includes a housing 1102 having an injection molded frame 1108 for mounting in an aperture in a vehicle panel. The frame 1108 has an exterior face 1112, an interior face 1114 opposite the exterior face 1112, and at least one flow opening 1116 extending between the exterior face 1112 and the interior face 1114. In the example illustrated, the frame 1108 has a single flow opening 1116.

Figure 21:
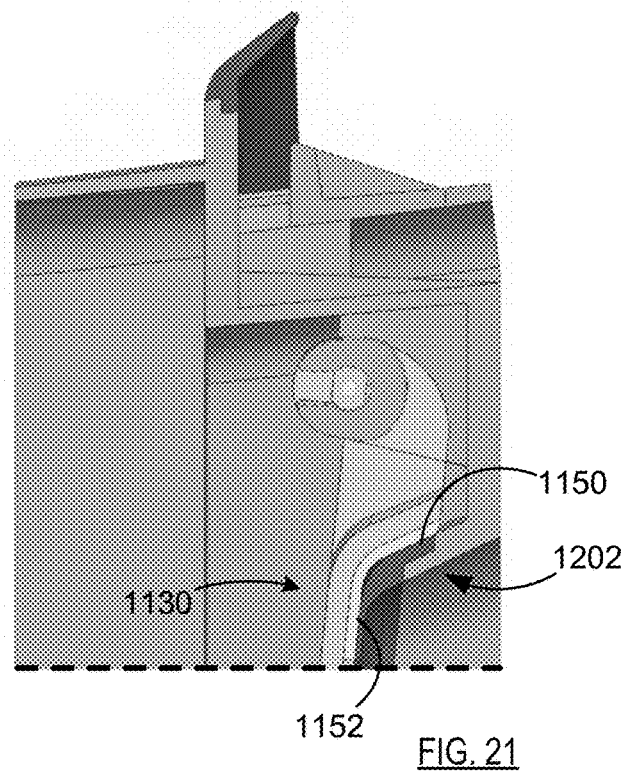
FIG. 21 is a cross-sectional view of housing and flap portions of the valve apparatus of FIG. 19, taken along line 21-21, and showing the flap portion in a closed configuration.
Figure 22:
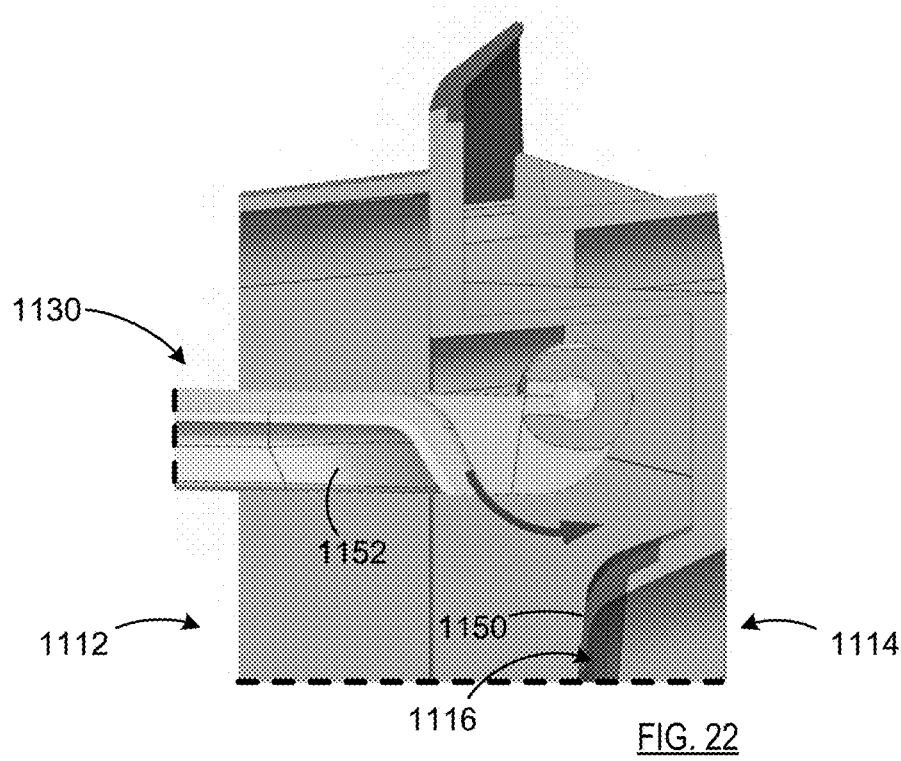
FIG. 22 is a cross-sectional view like that of FIG. 21, but showing the flap portion in an open configuration.

In the example illustrated, the valve apparatus 1100 further includes at least one injection molded flap 1130 having a flap connection portion 1132 joined to the frame 1108 adjacent an upper edge of the flow opening 1116. In the example illustrated, the valve apparatus 1100 includes a single flap 1130. Referring to FIGS. 21 and 22, the flap 1130 is pivotable between a closed position (FIG. 21) in which the flow opening 1116 is blocked by the flap 1130, and an open position (FIG. 22) in which the flow opening 1116 is unblocked for permitting pressurized air at the interior face 1114 of the frame 1108 to vent through the flow opening 1116.

Referring to FIG. 20, in the example illustrated, the housing 1102 has an optional valve seat 1150 around the flow opening 1116. When in the closed position, the flap 1130 is in sealed engagement with the valve seat 1150 to block the flow opening 1116. In the example illustrated, when in the open position, the flap 1130 is spaced apart from the valve seat 1150 to unblock the flow opening 1116.

In the example illustrated, the frame 1108 is formed of a first polymer material in an injection molding process. In the example illustrated, the valve seat 1150 is formed of a second polymer material integrally with the frame in the injection molding process. The second polymer material is softer than the first polymer material. In the example illustrated, the first polymer material and the second polymer material are the same to those of the valve apparatus 100. In the example illustrated, the frame 1108 is formed in a first shot of the injection molding process, and the valve seat 1150 is formed in a second shot in the injection molding process.

In the example illustrated, the housing 1102 has an optional outer peripheral seal 1140 for bearing against the vehicle panel around the aperture. In the example illustrated, the outer peripheral seal 1140 is formed of the second polymer material integrally with the frame 1108 in the injection molding process. In the example illustrated, the outer peripheral seal 1140 is formed in the second shot of the injection molding process.

In the example illustrated, the flap 1130 has a marginal seal portion 1152 extending along outer edges of the flap 1130 and bearing against the valve seat 1150 when the flap 1130 is in the closed position. In the example illustrated, the flap 1130 has a relatively rigid flap body 1200 formed of the first polymer material for covering the flow opening 1116. In some cases, having a relatively rigid flap body 1200 can facilitate more effective use of active retention features for retaining the door in the closed position (as discussed below), to help inhibit unwanted water from leaking into the vehicle compartment when the valve apparatus is partially (or fully) submerged. In the example illustrated, the seal portion 1152 is formed of the relatively softer second polymer material integrally with the flap body 1200 in a multi-shot injection molding process. In the example illustrated, the flap 1130 is formed separate from the housing 1102, and is mechanically assembled to the housing 1102 (e.g. through a hinge connection as described below) in a post-mold operation.

Referring to FIG. 20, in the example illustrated, the exterior face 1112 of the frame 1108 comprises a lip 1202 defining a raised peripheral edge circumscribing the flow opening 1116 and along which the valve seat 1150 extends. In the example illustrated, the flap 1130 has an interior face 1146 directed toward the frame 1108 and comprising the seal portion 1152 for sealed engagement with the valve seat 1150 on the lip 1202. In the example illustrated, the interior face 1146 of the flap 1130 comprises an endwall surface 1206 for covering the flow opening 1116, a sidewall surface 1208 projecting inwardly toward the frame 1108 from a periphery of the endwall surface 1206 to the outer edges of the flap 1130, and an interior 1210 bounded by the endwall and sidewall surfaces 1206, 1208. In the example illustrated, the marginal seal portion 1152 comprises the sidewall surface 1208 and a portion of the endwall surface 1206 adjacent the sidewall surface 1208. The interior 1210 is open inwardly toward the frame 1108 for receiving the valve seat 1150 in a nested, sealed fit with the seal portion 1152 when the flap 1130 is in the closed position.

Figure 23:
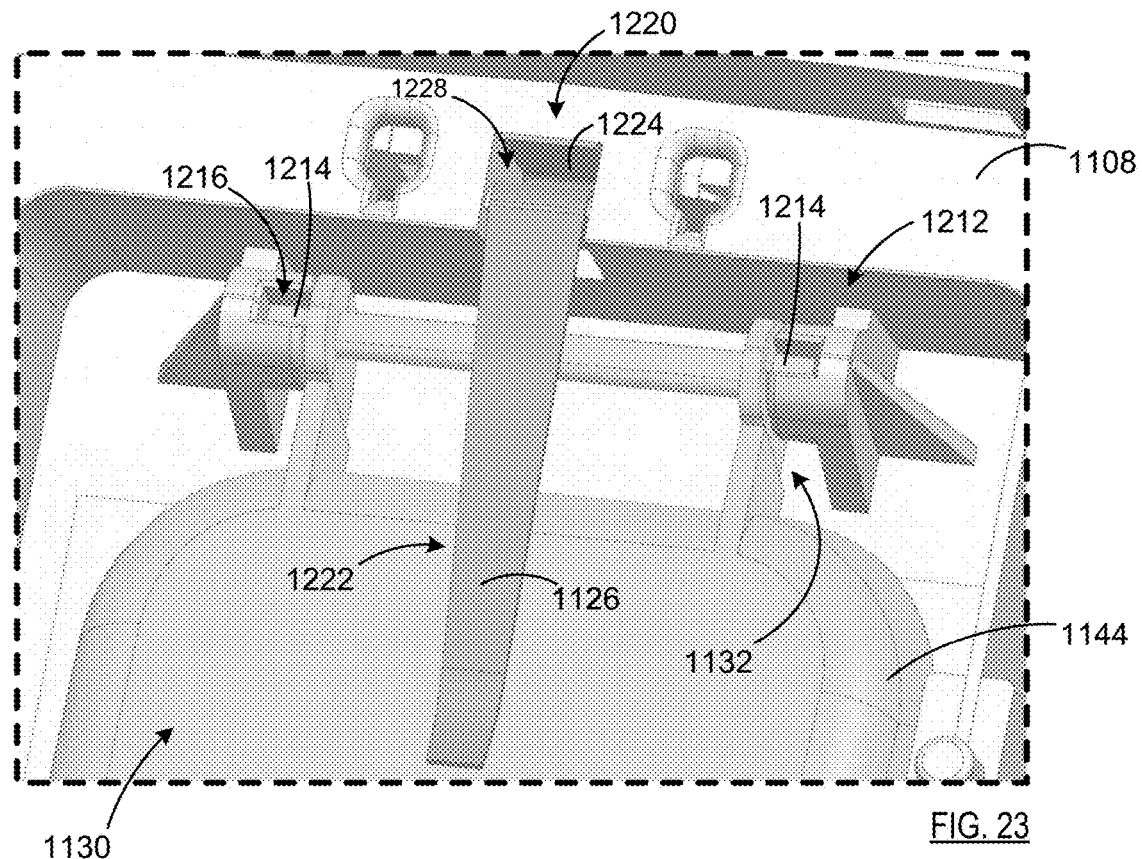
FIG. 23 is an enlarged exterior view of an upper portion of the valve apparatus of FIG. 19.

Referring to FIG. 23, in the example illustrated, the flap connection portion 1132 is joined mechanically to the frame 1108 through a hinge connection 1212 for pivoting of the flap 1130 between the open and closed positions. In the example illustrated, the hinge connection 1212 comprises a pair of trunnions 1214 projecting laterally from opposite sides of the flap connection portion 1132 and received in corresponding slots 1216 fixed to the frame 1108 adjacent the upper edge of the flow opening 1116.

Figure 24:
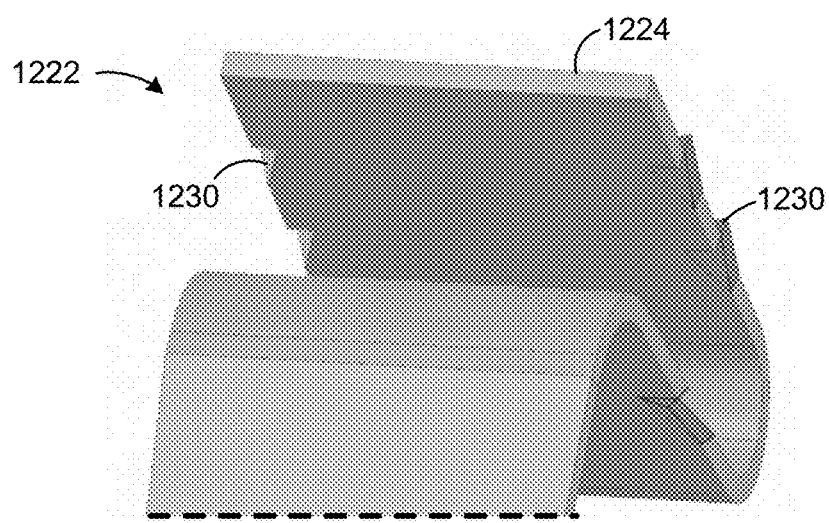
FIG. 24 is an enlarged view of an upper portion of a retention device of the valve apparatus of FIG. 19.

In the example illustrated, the valve apparatus 1100 further includes a retention device 1220 for retaining the flap 1130 in the closed position and accommodating movement of the flap 1130 toward the open position in response to the pressurized air exerting an opening force on the flap 1130 sufficient to overcome an opposing retention force exerted by the retention device 1220. This can help to, for example, actively retain the flap 1130 in the closed position (in sealed engagement against the housing 1102) when the flap 1130 is partially (or fully) submerged in water, to help keep the water from entering the interior compartment from the exterior environment via the flow opening 1116. In the example illustrated, the retention device 1220 comprises a spring 1222 mounted to the frame 1108 and biasing the flap 1130 toward the closed position. In the example illustrated, the spring 1222 has a base portion 1224 fixed to the frame 1108 and a spring arm 1226 extending from the base portion 1224 into pushing engagement against the exterior face 1144 of the relatively rigid flap body 1200 to urge the flap 1130 toward the closed position. In the example illustrated, the frame 1108 has a recess 1228 in the exterior face of the frame 1108 for receiving the base portion 1224 of the spring 1222. Referring to FIG. 24, in the example illustrated, the base portion 1224 has a plurality of barbs 1230 projecting therefrom for engagement with inner surfaces of the recess 1228 when the base portion 1224 is received therein to secure the spring 1222 to the frame 1108.

The invention claimed is:

1. A pressure relief valve apparatus for a vehicle compartment, comprising:
   a) a housing having an injection molded frame for mounting in an aperture in a vehicle panel, the frame formed of a first polymer material in an injection molding process, and the frame having an exterior face, an interior face opposite the exterior face, and at least one flow opening extending between the exterior face and the interior face, the housing further having a respective valve seat around each flow opening, each valve seat formed of a second polymer material integrally with the frame in the injection molding process, the second polymer material softer than the first polymer material; and
   b) at least one injection molded flap, each flap having a flap connection portion joined to the frame adjacent an upper edge of a respective flow opening, and each flap pivotable between a closed position in which the flap is in sealed engagement with the respective valve seat to block the respective flow opening, and an open position in which the flap is spaced apart from the valve seat to unblock the flow opening for permitting pressurized air at the interior face of the frame to vent through the flow opening.

2. The valve apparatus of claim 1, wherein the frame is formed in a first shot of the injection molding process, and each valve seat is formed in a second shot in the injection molding process.

3. The valve apparatus of claim 2, wherein the housing has an outer peripheral seal for bearing against the vehicle panel around the aperture, the outer peripheral seal formed integrally with the frame in the injection molding process.

4. The valve apparatus of claim 3, wherein the outer peripheral seal is formed of the second polymer material in the second shot of the injection molding process.

5. The valve apparatus of claim 1, wherein each flap has a seal portion extending along outer edges of the flap and bearing against the respective valve seat when the flap is in the closed position, the seal portion formed of the second polymer material.

6. The valve apparatus of claim 5, wherein each flap has a flap body formed of the first polymer material for covering the respective flow opening, and wherein the seal portion of the flap is formed integrally with the flap body in the injection molding process.

7. The valve apparatus of claim 5, wherein the exterior face of the frame comprises at least one lip, each lip defining a raised peripheral edge circumscribing a respective flow opening and along which the respective valve seat extends.

8. The valve apparatus of claim 7, wherein each flap has an interior face directed toward the frame, the interior face having an endwall surface for covering the respective flow opening and a sidewall surface projecting inwardly toward the frame from a periphery of the endwall surface to the outer edges of the flap, and wherein the seal portion comprises the sidewall surface and a portion of the endwall surface adjacent the sidewall surface.

9. The valve apparatus of claim 8, wherein the flap has an interior bounded by the endwall and sidewall surfaces, the interior open inwardly toward the frame for receiving the respective valve seat in a nested, sealed fit with the seal portion when the flap is in the closed position.

10. The valve apparatus of claim 1, further comprising at least one retention device, each retention device for retaining a respective flap in the closed position and accommodating movement of the flap toward the open position in response to the pressurized air exerting an opening force on the flap sufficient to overcome an opposing retention force exerted by the retention device.

11. The valve apparatus of claim 10, wherein the retention device comprises a spring mounted to the frame and biasing the flap toward the closed position.

12. The valve apparatus of claim 1, wherein the flap connection portion is joined mechanically to the frame through a hinge connection for pivoting of the flap between the open and closed positions.

13. The valve apparatus of claim 12, wherein the hinge connection comprises a pair of trunnions projecting laterally from opposite sides of the flap connection portion and received in corresponding slots fixed to the frame adjacent the upper edge of the respective flow opening.

14. The valve apparatus of claim 1, wherein the frame and the at least one flap are integrally formed in the injection molding process.

15. The valve apparatus of claim 14, wherein the at least one flap is formed entirely of the second polymer material.

16. The valve apparatus of claim 14, wherein the frame is formed in a first shot in the injection molding process, and the at least one flap is formed in a second shot in the injection molding process, with the flap connection portion of each flap over-molded onto the frame adjacent the upper edge of the respective flow opening.

17. The valve apparatus of claim 16, wherein each valve seat is formed in the second shot of the injection molding process.

18. The valve apparatus of claim 17, wherein the housing has an outer peripheral seal for bearing against the vehicle panel around the aperture, the outer peripheral seal formed of the second polymer material integrally with the frame in the second shot of the injection molding process.

19. The valve apparatus of claim 1, wherein each valve seat includes a bead projecting outwardly from the frame, and each flap includes a groove for receiving the bead of a respective valve seat when in the closed position.

20. The valve apparatus of claim 1, wherein each flap has a flap upper portion adjacent the flap connection portion and a flap lower end opposite the flap upper end, and the flap has a flap thickness of the second polymer material extending between an interior face of the flap and an exterior face of the flap, the flap thickness greater at the flap lower end than at the flap upper end to facilitate holding the flap in the closed position by gravity.

21. The valve apparatus of claim 20, wherein the flap thickness is tapered when viewed in cross section, from a narrower thickness at the flap upper end to a wider thickness at the flap lower end.

22. The valve apparatus of claim 1, wherein each flap includes a living hinge proximate the flap connection portion, the flap pivotable about the living hinge between the open and closed positions.

23. The valve apparatus of claim 22, wherein the living hinge extends horizontally between opposed side edges of the flap and includes an arcuate segment that, in cross-section, protrudes convexly away from the frame between an upper hinge edge adjacent the flap connection portion and a lower hinge edge spaced vertically below the upper hinge edge, wherein the arcuate segment is resiliently movable from an expanded state to a collapsed state when the flap is moved from the closed position to the open position, the arcuate segment biased to the expanded state for urging the flap to the closed position.

24. The valve apparatus of claim 23, wherein a gap is provided between the frame and a back surface of the arcuate segment of the living hinge, the gap facilitating positive engagement of the flap against a valve seat upper surface of the valve seat above the respective flow opening when the flap is in the closed position.

25. The valve apparatus of claim 1, wherein each flap has a flap upper portion adjacent the flap connection portion and a flap lower portion opposite the flap upper portion, the flap lower portion bearing against a valve seat lower surface of the respective valve seat adjacent a lower edge of the flow opening when the flap is in the closed position, and the flap further including a flap return extending below the valve seat lower surface of the housing and protruding inwardly from an interior surface of the flap, the flap return further inhibiting liquid intrusion though the respective flow opening when the flap is closed.

26. The valve apparatus of claim 25, wherein each flap return extends generally orthogonally from the flap interior surface in a direction away from a flap exterior surface of the flap, the flap exterior surface opposite the flap interior surface, and wherein the flap lower portion and the flap return generally form a "J-shape" when viewed in cross-section.

27. The valve apparatus of claim 1, wherein each valve seat includes a valve seat upper surface adjacent an upper edge of the respective flow opening, a valve seat lower surface adjacent a lower edge of the flow opening, and a pair of spaced-apart valve seat side surfaces extending between the valve seat upper and lower surfaces and adjacent opposed side edges of the flow opening, wherein the valve seat upper surface and valve seat lower surface are aligned in an opening plane that is inclined to the vertical, with the valve seat lower surface positioned further outward relative to the valve seat upper surface.

28. The valve apparatus of claim 27, wherein the valve seat side surfaces are curved outwards relative to the opening plane, with upper and lower ends of each valve seat side surface generally positioned in the opening plane, and a vertically middle portion of each valve seat side surface protruding outward of the opening plane, wherein as the respective flap moves from the open position to the closed position, the flap engages the valve seat side surfaces progressively, from the upper ends to the lower ends of the valve seat side surfaces to reduce noise generated when the flap moves into the closed position.

29. The valve apparatus of claim 1, wherein each flap has an exterior surface textured with a pattern of protrusions for enhancing noise reduction by dissipating sound energy.

30. The valve apparatus of claim 1, wherein each valve seat comprises a valve seat lower surface adjacent a lower edge of the respective flow opening for engagement with a flap lower portion of the flap when in the closed position, the valve seat lower surface and the flap lower portion comprising respective tongues and grooves for inter-engaging with each other when the flap is in the closed position.

31. The valve apparatus of claim 1, wherein the flap connection portion of each flap is provided with a plurality of flap apertures for receiving respective retaining protrusions extending from the housing along the upper edge of the flow opening to assemble the flap to the housing.

32. The valve apparatus of claim 1, wherein the at least one flow opening comprises a plurality of the flow openings, and the at least one flap comprises a plurality of the flaps equal in quantity to the plurality of the flow openings, each flap for blocking and unblocking a respective flow opening.

* * * * *